(12) United States Patent
Behnke et al.

(10) Patent No.: US 7,362,233 B2
(45) Date of Patent: Apr. 22, 2008

(54) METHOD AND APPARATUS FOR ASCERTAINING THE QUANTITY OF A CROP HARVESTED IN A COMBINE

(75) Inventors: Willi Behnke, Steinhagen (DE); Joachim Baumgarten, Beelen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 318 days.

(21) Appl. No.: 10/940,437

(22) Filed: Sep. 14, 2004

(65) Prior Publication Data

US 2005/0143153 A1 Jun. 30, 2005

(30) Foreign Application Priority Data

Sep. 19, 2003 (DE) ............................. 103 43 916
Dec. 15, 2003 (DE) ............................. 103 58 954

(51) Int. Cl.
*G08B 21/00* (2006.01)
(52) U.S. Cl. .......................................... 340/684; 460/5
(58) Field of Classification Search ............... 460/4, 460/5, 6, 149, 11, 114; 340/684, 459; 56/10.2 R; 73/865.9
See application file for complete search history.

(56) References Cited

U.S. PATENT DOCUMENTS

| 4,296,409 A | * | 10/1981 | Whitaker et al. ........... 340/684 |
| 4,517,792 A | * | 5/1985 | Denning et al. ............... 460/5 |
| 5,015,997 A | * | 5/1991 | Strubbe ...................... 340/684 |
| 5,978,720 A | * | 11/1999 | Hieronymus et al. ......... 701/29 |
| 6,053,811 A | * | 4/2000 | Johnson et al. ................ 460/6 |
| 6,119,442 A | * | 9/2000 | Hale ...................... 56/10.2 H |
| 6,342,006 B1 | | 1/2002 | Bauch et al. |
| 6,863,604 B2 | * | 3/2005 | Behnke ......................... 460/6 |
| 7,074,125 B2 | * | 7/2006 | Ho et al. ........................ 460/6 |

FOREIGN PATENT DOCUMENTS

DE 199 12 372 C1 11/2000

* cited by examiner

*Primary Examiner*—Árpád Fábián Kovács
(74) *Attorney, Agent, or Firm*—Michael J. Striker

(57) ABSTRACT

A method and an apparatus for ascertaining the quantity of the tailings (39), output into a tailing augur (46) of a combine (1) and composed of grains (35) and non-grain components, in which the quantity of the tailings (39) is displayed by means of generating grain stream signals (X) and crop stream signals (Y, Z), and the quantity of the tailings (39) is detected in a cleaning system (18), assigned to the combine (1), or in a portion of the cleaning system (18), so that the quantity of the crop harvested (39) is relatively precisely ascertained and conclusively displayed in a simple way.

11 Claims, 3 Drawing Sheets

METHOD AND APPARATUS FOR ASCERTAINING THE QUANTITY OF A CROP HARVESTED IN A COMBINE

CROSS-REFERENCE TO A RELATED APPLICATION

The invention described and claimed hereinbelow is also described in German Patent Application DE 10343916.1 filed on Sep. 19, 2003 and DE 10358954.6 filed on Dec. 15, 2003. This German Patent Application, whose subject matter is incorporated here by reference, provides the basis for a claim of priority of invention under 35 U.S.C. 119(a)-(d).

BACKGROUND OF THE INVENTION

The invention relates to a method and an apparatus for ascertaining the quantity of a crop harvested in a combine.

From German Patent DE 199 12 372 C1, an apparatus for measuring at least a portion of the grains in the tailings has become known. Along the feeding path taken by the crop being harvested, filtered out by a cleaning system, to a further processing device, there is a sensor that counts only the grains. Upstream of the sensor in the feeding direction of the tailing augur, there is an ear screw in a housing. The housing is equipped, in the region pointing toward the sensor, with adaptable openings through which the grains pass. The signals generated by the sensor are made visible to the driver in the cab on a display.

A disadvantage of this embodiment is that the measurement values for the number of grains are shown in the form of absolute values. The measurement values displayed lack the relationship with the throughput, for instance, or other crop streams in the cleaning system.

For the driver, it is above all the ratio of the quantity of grains in the tailings to the total quantity of the tailings that is decisive, since this ratio in a simple way reflects the quality of the cleaning system's performance.

SUMMARY OF THE INVENTION

It is therefore the object of the invention to refine a method and an apparatus for ascertaining a quantity of a crop harvested in a combine in such a way that the quantity of the crop being harvested is ascertained relatively precisely in a simple way and conclusively displayed.

Because the quantity of the crop being harvested in the tailings is represented by means of generating grain stream signals and crop stream signals, the composition of the quantity of the crop being harvested can be displayed. From the composition of the quantity of the crop being harvested, the driver can assess the effectiveness of the cleaning system.

Advantageously, the grain stream signals are generated with a grain stream measuring instrument, which includes at least one pulse density sensor, so that the grains contained in the crop stream being harvested in the tailings are detected without first having to separate the grains from the non-grain components.

Because the pulse density sensor for measuring the number of grains is a rod sensor, the crop stream being harvested in the combine is unimpeded, and the pulse density attains a magnitude that is usable for further processing.

Because the rod sensors are located in the outlet region of the crop being harvested in the tailings leaving the cleaning system, it is assured that the tailings will drop without hindrance in free fall onto the rod sensors, whereupon, because of what is known as structure-borne sound, the grains generate a usable signal in the rod sensors.

The rod sensor is secured to the collector and guide pan of the tailing auger by a rubber spring element, so that vibrations while driving, for instance, are transmitted in attenuated form to the rod sensor. Strong unattenuated vibrations can otherwise cause the rod sensor to vibrate, causing grain signals to be tripped without the grains actually striking the rod sensor.

The crop stream signal is advantageously generated by a volumetric stream measuring instrument, which measures a volumetric tailings stream in an ear elevator, so that the quantity of the tailings, composed of grains and non-grain components, can be measured continuously.

In order that not only the proportion of grain in the crop harvested and the quantity of the tailings but also the grain losses can be determined, the system of the invention may furthermore have a volumetric stream measuring instrument, which generates a grain stream signal that replicates the total quantity of grain harvested.

In order for the results of the measurement to be displayed without delay to the driver, the grain stream signals and the crop stream signal are forwarded to an evaluation and display unit. From them, the evaluation and display unit ascertains not only the quantity of grain in the tailings and the quantity of the tailings but also a quantity of grain in the crop being harvested that represents the quantity of harvested grain.

If from the grain stream signal, a thousand-grain mass of the type of fruit, and an area equivalent comprising the sensor area and the usable filtration area of the tailing auger, the evaluation and display unit calculates a tailings grain mass, this grain mass can for instance be expressed as a ratio to the mass of the tailings. The value of the mass ratio is displayed in the form of a percentage on a display and serves to assess the effectiveness of the cleaning system.

In a comparable way, from the grain stream signal, a thousand-grain mass of the type of fruit, the area equivalent comprising the sensor area and the usable separation area of the tailing augur and a specific density, the evaluation and display unit could calculate a harvested grain volume and set it in proportion to the volumetric tailings stream. The volumetric ratio may likewise be displayed as a percentage on a display and thus also serves to assess the effectiveness of the cleaning system.

In a first variant embodiment, the harvested gain quantity and the quantity of the tailings are displayed quantitatively simultaneously in separate displays on a screen of the evaluation and display unit. The driver sees both the absolute values and the ratio of the absolute values to one another. With this display, the driver has the capability of learning when the crop streams in the elevators for instance reach maximum allowable volumetric streams.

In an alternative variant embodiment, the harvested gain quantity and the quantity of the tailings are displayed qualitatively on a display on the screen. The evaluation and display unit has already linked the signals with one another, which relieves the driver of this task.

A tailings sensing device that generates high-quality tailings signals is obtained if the quantity of the tailings is detected at least in part in a cleaning system associated with the combine, or in a portion of the cleaning system, since in this region the influence of events that adulterate the measurement values is still slight.

Especially high-quality signal ascertainment is attained if in this region of the cleaning, the proportion of grain in the tailings is ascertained, since at the transition from the cleaning system to the tailing augur, the grains must travel a relatively long distance counter to the action of gravity, and thus in a simple way, by means of time-tested sensor systems, the number of grains and hence the proportion of grain in the tailings can be detected.

A structurally particularly simple embodiment for ascertaining the proportion of grain in the tailings is obtained if at least one grain stream measuring instrument in the region of the cleaning system is provided, which by means of so-called pulse density sensors generates grain stream signals, which qualitatively and/or quantitatively, in an evaluation and display unit, represent the proportion of grain in the tailings.

If the cleaning system has a plurality of screen planes, then in an advantageous refinement of the invention, each screen plane is assigned at least one grain stream measuring instrument. This has the advantage that a more-individual reaction to the filtration characteristics of the individual screen planes can be made, because different settings for the screens of the various screen planes are provided.

In an advantageous refinement of the invention, the grain stream signals of the plurality of grain stream measuring instruments are processed and displayed as screen-plane-dependent grain proportions in the evaluation and display unit, so that the operator receives more-accurate information about the filtration characteristic of the individual screen planes.

Further advantageous embodiments are the subject of further dependent claims and will be described below in conjunction with an exemplary embodiment shown in several drawings.

DESCRIPTION OF THE PREFERRED EMBODIMENTS

Figure 1:
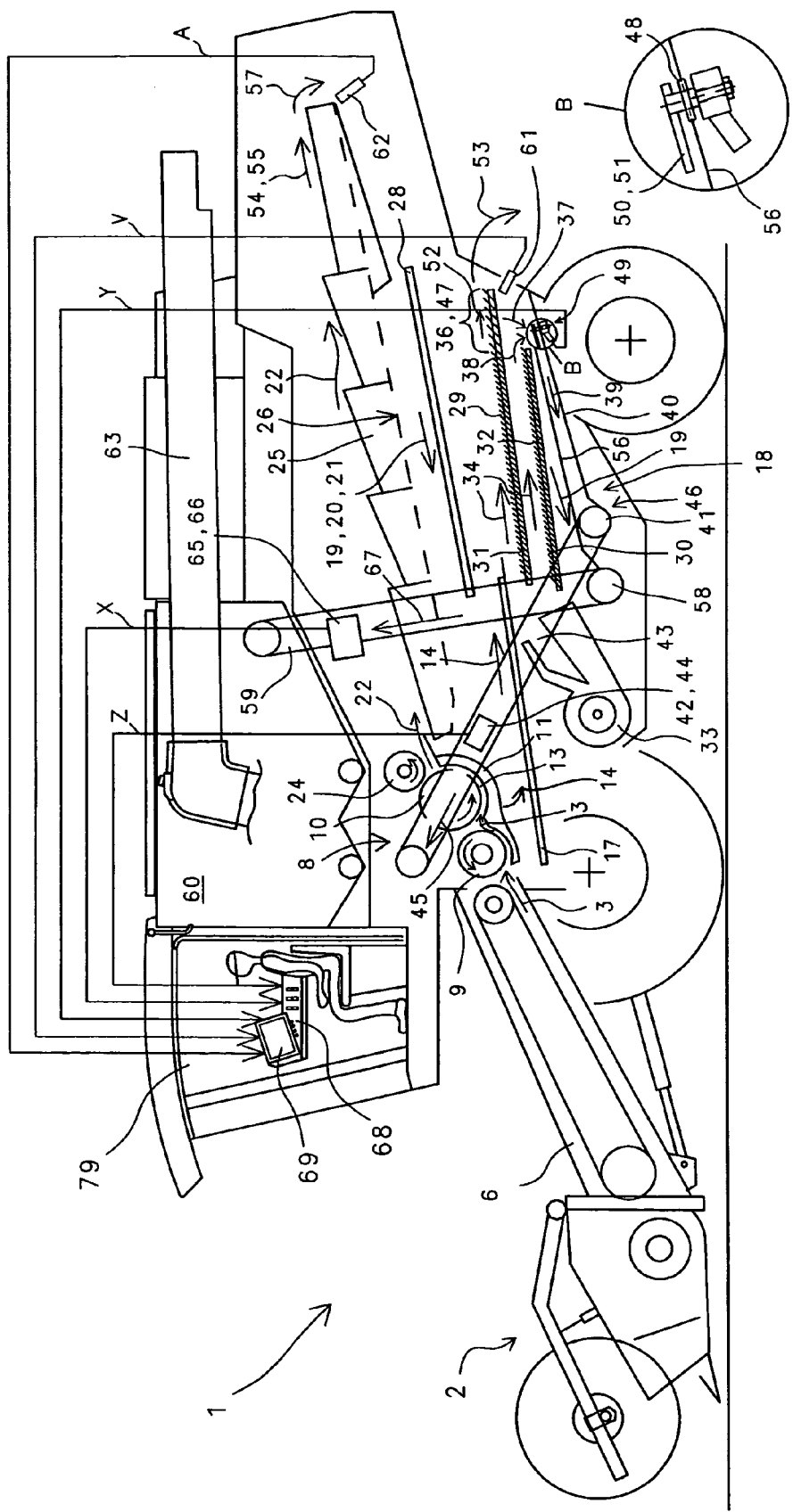
FIG. 1, a schematic cross section through a combine having a measuring apparatus according to the invention.

The exemplary embodiment of the invention shown in FIG. 1 involves a self-propelled combine 1, with a so-called tangential thresher mechanism 8 and downstream of it a hurdle shaker 25 as a filtration device. Below the hurdle shaker 25, there is a cleaning system 18, comprising two screens 31, 32, disposed in graduated fashion one above the other, and a blower 33. However, the invention is expressly not limited to combine types embodied in this way.

The mode of operation of a combine 1 of this kind will now be described. The crop being harvested 3 is first picked up by a cutting mechanism 2, which delivers the crop being harvested 3 to an inclined conveyor 6. The inclined conveyor 6 transfers the crop being harvested 3 to the threshing devices 9, 10, 11 in its rear region.

At the entrance to the thresher mechanism 8, there is a pre-accelerator drum 9, which is followed downstream, in the crop flow direction, by a threshing drum 10. The pre-accelerator drum 9 and the threshing drum 10 are at least partly sheathed from below by a threshing basket 11.

The crop being harvested 3 emerging from the inclined conveyor 6 is engaged by the pre-accelerator drum 9 and is drawn onward by the threshing drum 10 through the threshing gap 13 formed between the threshing drum 10 and the threshing basket 11. The threshing drum 10 processes the crop being harvested mechanically at this point, and as a consequence, a grain and chaff mixture 14 is filtered out at the threshing basket 11 and delivered via a preparation pan 17 to the cleaning system 18, so that the grains 19 can be separated from the non-grain components, that is, from the stem parts 20 and chaff parts 21.

From the thresher mechanism 8, the crop stream 22, substantially comprising stems that have been threshed out, then passes via the inverter drum 24, rotating counterclockwise, reaches the hurdle shaker 25, which feeds the crop stream 22 into the rear region of the combine 1. In the process, the grains 19 still located in the crop stream 22 are separated out along with any short straw 20 and chaff 21 that is present, by dropping through the hurdle shaker 25, which is provided with screen openings 26, onto a return pan 28. The return pan 28 transports grains 19, short straw 20, and chaff 21 to the preparation pan 17.

The grains 19, short straw 20 and chaff 21 finally, also via the preparation pan 17, reach the inside of the cleaning system 18, in which the grains 19 are separated from the short straw 20 and chaff 21. This is done in such a way that an air stream is passed through the screen openings 29, 30 in the upper screen 31 and the lower screen 32 by means of the blower 33, and this air stream loosens up the crop being harvested 34, which is guided via the screens 31, 32 into the rear region of the combine 1, and assures that the specifically lighter-weight chaff and short straw components 20, 21 will be separated out, while the heavy grains 19 of crop being harvested drop through the screen openings 29, 30. The screens 31, 32 are disposed partly one above the other, so that the crop being harvested is screened to different fineness in two stages; the mesh width of the screens 31, 32 is variable. By varying the mesh width and/or the rpm of the blower 33, the proportion and composition of the quantity of crop being harvested that passes through the screen openings 29, 30, known as the material 37 passed through the screen, and the proportion, known as the overflow 38 from the screen, that is transported over the screen 31, 32 can be varied. Moreover, the upper screen 31 is as a rule embodied such that it has greater mesh widths in a rearward region known as the tailings region 36.

Material 37 passed through the screen, which drops through the upper screen 31 in the tailings region 36, and overflow 38 from the screen at the end of the lower screen 32 both as a rule contain heavier particles, or in other words ears that have not been threshed out. The material 37 passed through the screen along with the overflow 38 from the screen is hereinafter referred to as the tailings 39. The tailings 39 drop onto an inclined collector pan 40 below the cleaning system 18 and slide into an ear feed screw 41. The ear feed screw 41 feeds the tailings 39 into an ear elevator 43, which returns it to the thresher mechanism 8. The collector pan 40, ear feed screw 41 and ear elevator 43 together form a tailing augur 46. In the ear elevator 43, there is a volumetric stream measuring instrument 42, known per se, which substantially comprises a light gate 44 that generates a product stream signal Z, which varies as a function of the volumetric tailings stream 45, being fed, of the tailings 39 and thus forms a measure of the quantity of the tailings 39.

Figure 4:
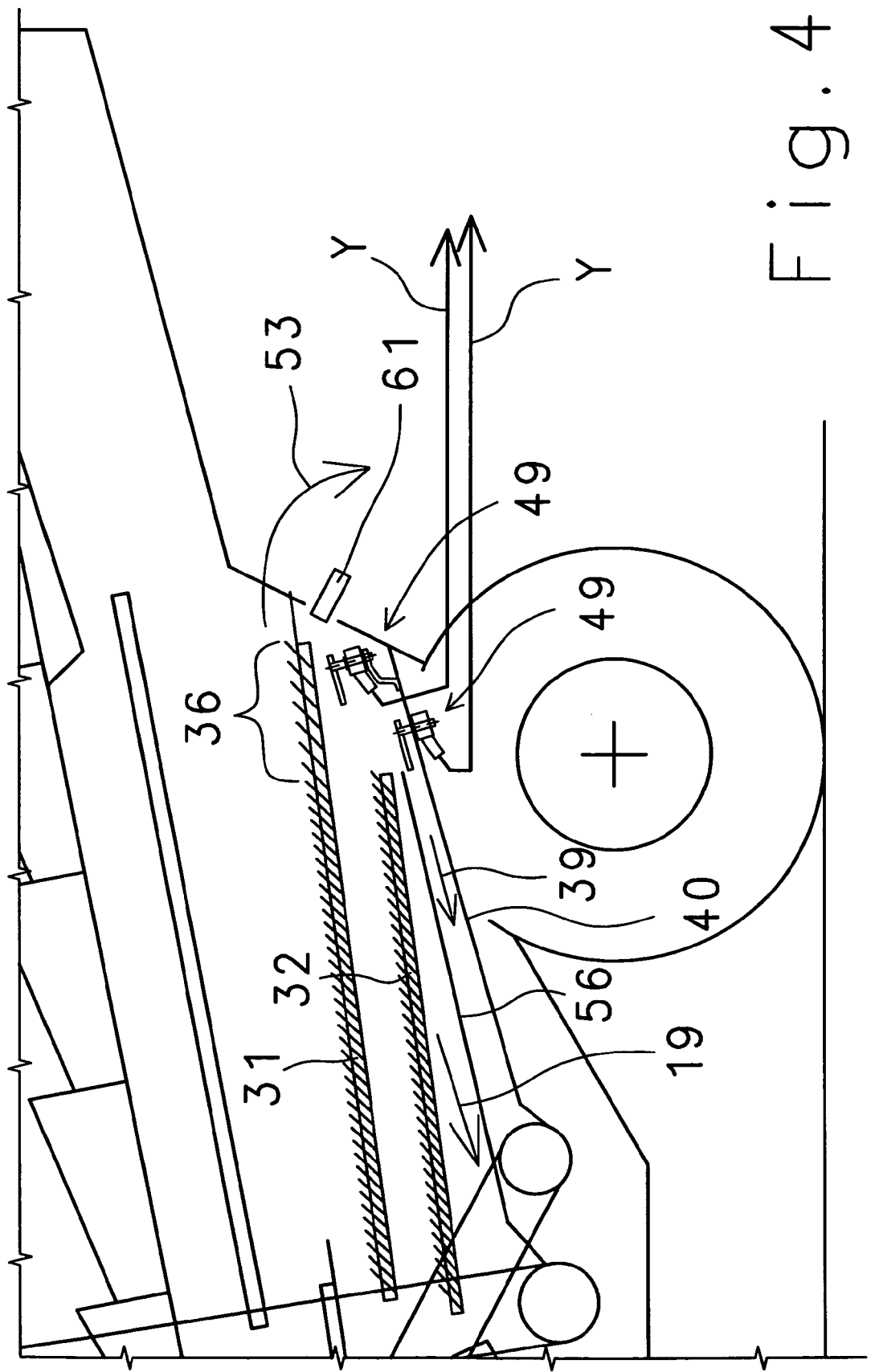
FIG. 4, a detail of FIG. 1, with measuring apparatuses of the invention.

To determine a proportion of grains 35 in the tailings quantity 39, a grain stream measuring instrument 49 is mounted on the end of the lower screen 32, in the outlet region 47 of the tailings 39 from the cleaning system 18, and it includes a plurality of pulse density sensors 50 (see the enlarged detail B). The pulse density sensors 50 are rod sensors 51, which are known per se and therefore not explained in further detail. The rod sensors 51 generate a grain stream signal Y, which varies in proportion to the detected number of grains 35 in the tailings quantity 39. Each rod sensor 49 is secured by a rubber spring element 48 to the collector pan 56 of the tailings device 46. For generating highly precise grain stream signals Y for the stream 39 of the crop being harvested, each screen plane 31, 32 may, as shown in FIG. 4, be assigned a separate grain stream measuring instrument 49; the grain stream signals Y now generated form a measure of the proportion of grain in the tailings filtered out at the upper screen 31 and the total proportion 35 of grain contained in the stream 39 of the crop being harvested. This has the advantage in particular that separate information for the lower and upper screens 31, 32 can be made available to the operator of the combine 1, which enables him to act more precisely on the cleaning losses 53 in such a way that the upper and lower screens 31, 32 are given different settings.

For the sake of simplicity, see the further description of FIG. 1, although the effects to be described also refer to the disposition of a plurality of grain stream measuring instruments 49 as in FIG. 4.

The overflow 52 from the screen, which does not drop through the upper screen 31, is ejected in the rear region of the combine 1; the grains contained in this overflow 52 from the screen form the cleaning loss 53. The cleaning loss 53 is detected in a manner known per se with knocking sensors 61. The cleaning loss signal V generated by the knocking sensors 61 is substantially proportional to the cleaning losses 53.

Both the straw 54 and a certain percentage of lost grains 55 migrate via the hurdle shaker 25 to the rear end of the combine 1, where they are ejected as filtration loss 57. The filtration loss 57 is also detected in a manner known per se by knocking sensors 62. The filtration loss signal A generated by the knocking sensors 62 is substantially proportional to the filtration losses 57. The grains 19 that have passed through both screens 31, 32 of the cleaning system 18 drop onto a further inclined collector and guide pan 56 and slide into a grain feed screw 58, which delivers the grains 19 to a grain elevator 59. From the grain elevator 59, they are then fed into a grain tank 60 of the combine 1, where they can be reloaded as needed onto a transport cart by a tank emptying conveyor 63. A volumetric stream measuring instrument 65 known per se is disposed in the grain elevator and substantially comprises a light gate assembly 66, which measures the volumetric stream of grain 67 being fed. The at least one light gate assembly 66 generates a crop stream signal Z, which varies in proportion to the volumetric stream of grain 67. It is within the scope of the invention that for improving the crop stream signals Z, more than one light gate 66 may also be provided.

The volumetric stream measuring instruments 42, 65 and the grain stream measuring instruments 49 as well as the knocking sensors 61, 62 are connected to an evaluation and display unit 68, which is preferably located in the cab 79. The crop stream signals X, Z generated by the light gates 44, 66 and the grain stream signals Y generated by the rod sensors 51, along with the filtration loss signals A and the cleaning loss signals V are transferred to the evaluation and display unit 68. With the crop stream signals X, Z, the evaluation and display unit 68 calculates the total quantity of grain harvested as well as the quantity of the tailings 39; with the grain stream signal Y, it calculates the proportion 35 of grain harvested; and with the filtration loss signals A and the cleaning loss signals V, it calculates both the cleaning losses 53 and the filtration losses 57. The number of grains ascertained by the rod sensors 51 is converted in a manner known per se, with an area equivalent comprising the sensor area and the usable filtration area, into an actual number of grains present; the area equivalent is stored in memory in the evaluation and display unit 68. The evaluation and display unit 68 may furthermore calculate the corresponding mass of grains, using the calculated number of grains and the thousand grain mass for that particular type of fruit, or the grain volume, using the specific density of the grains. In addition, the possibility exists that the evaluation and display unit 68 will calculate mass and/or volume ratios between crop stream quantities or grain quantities. The calculated values are displayed on a screen 69 of the evaluation and display unit 68; the quantity of the crop harvested 39 is displayed by means of the generation of grain signals Y and crop stream signals Z, X.

Figure 2:
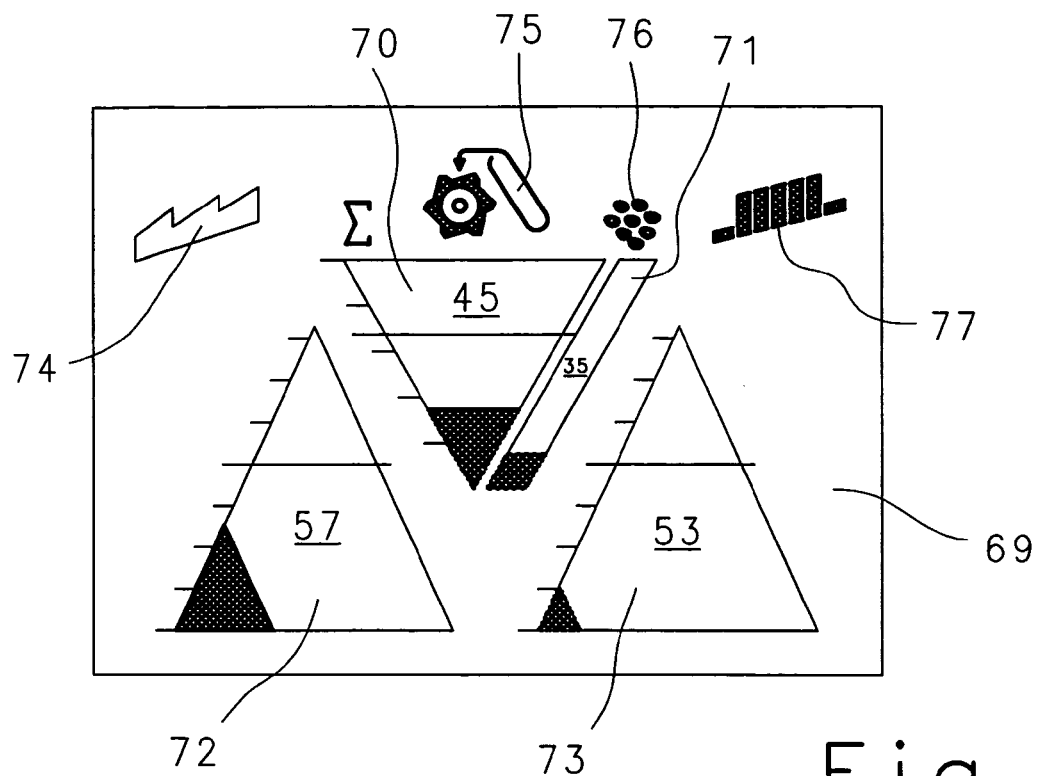
FIG. 2, a screen of the evaluation and display unit.

FIG. 2 shows a first exemplary embodiment of a screen 69 of the evaluation and display unit 68.

The screen 69 has a plurality of displays 70-73, which make information available to the driver about machine settings and operating states of the combine 1. In a triangular graphical display 70 in the middle, the volumetric tailings stream 45 being conveyed at that moment in the ear elevator 43 is shown, which quantitatively corresponds to the quantity of the tailings 39. Along the right-hand leg of the triangular display, there is a trapezoidal graphical display 71, which at the same time quantitatively represents the proportion 35 of grain harvested, measured at that moment, in the quantity of the tailings 39. To the left and right beside it, there are two further triangular graphical displays 72, 73; the display 72 on the left shows the filtration loss 57, and the display 73 on the right shows the cleaning loss 53. To aid in recognition, symbols 74 through 77 are provided on the displays 70 through 73 and symbolize the parameters displayed.

Figure 3:
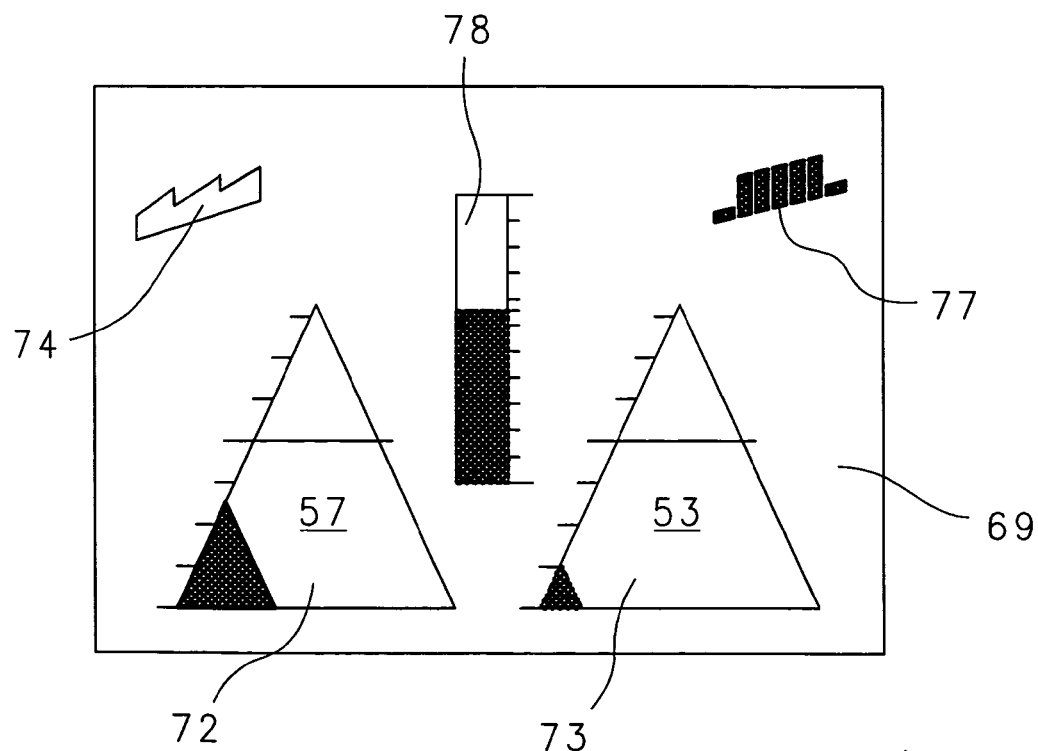
FIG. 3, a second version of a screen of the evaluation and display unit.

FIG. 3 shows a second exemplary embodiment of a screen 69 of the evaluation and display unit 68. The screen 69 differs in that between the two outer graphical displays 72, 73, there is only one rectangular graphical display 78. The rectangular graphical display 78 shows the ratio in percentage at that moment between the mass of the tailings grain quantity 35 and the mass of the tailings quantity 39. The ratio of these two mass streams is an indicator of the effectiveness of the cleaning system 18 and serves as a substitute for the subjective visual assessment of the quantity of the tailings 39 by the driver. From the combined displays 70 through 73 and 78, the driver can immediately tell how a change in the rpm of the blower 33 of the cleaning system 18, for instance, or an adjustment of the mesh width of the screens 31, 32, affects the cleaning action of the cleaning system 18. If one parameter changes, the driver can feasibly recognize the influence of the adjustment and can optimize the action of the cleaning system 18.

In closing, it will be pointed out once again that the combine shown in the drawings and the measuring apparatus, as well as the concrete method explained in conjunction with them, are solely exemplary embodiments, which can be varied in manifold ways by one skilled in the art without departing from the scope of the invention. For instance, the mass stream of grains in the tailing augur can be set into proportion to other mass streams detected, and the mass streams set in a ratio can be shown on a display. The ratios shown serve to monitor the effectiveness of the operating devices.

The masses, quantities and volumes displayed are equivalent to the mass streams, quantity streams and volumetric streams ascertained by the sensors in a defined time interval.

LIST OF REFERENCE NUMERALS

1 Combine
2 Cutting mechanism
3 Crop being harvested
6 Inclined conveyor
8 Thresher mechanism
9 Pre-accelerator drum
10 Threshing drum 11 Threshing basket
13 Threshing gap
14 Grain and chaff mixture
17 Preparation pan
18 Cleaning system
19 Grains
20 Stem parts/short straw
21 Chaff parts/chaff
22 Crop stream
24 Inverter drum
25 Hurdle shaker
26 Screen openings
28 Return pan
29 Screen openings, upper screen
30 Screen openings, lower screen
31 Upper screen
32 Lower screen
33 Blower
34 Crop being harvested
35 Proportion of grain in the tailings
36 Tailings region
37 Material passed through the screen
38 Screen overflow
39 Quantity of tailings
40 Collector pan
41 Ear feed screw
42 Volumetric stream measuring instrument
43 Ear elevator
44 Light gate
45 Volumetric tailings stream
46 Tailing augur
47 Outlet region
48 Rubber spring element
49 Grain stream measuring instrument
50 Pulse density sensor
51 Rod sensor
52 Screen overflow
53 Cleaning loss
54 Straw
55 Lost grains
56 Collector and guide pan
57 Filtration loss
58 Grain feed screw
59 Grain elevator
60 Grain tank
61 Knocking sensors
62 Knocking sensors
63 Grain tank emptying pipe
65 Volumetric stream measuring instrument
66 Light gate assembly
67 Volumetric stream of grain
68 Evaluation and display unit
69 Screen
70 Graphical display
71 Graphical display
72 Graphical display
73 Graphical display
74 Symbol
75 Symbol
76 Symbol
77 Symbol
78 Graphical display
79 Cab
A Filtration loss signal
V Cleaning loss signal
X Grain stream signal
Y Grain stream signal
Z Crop stream signal

The invention claimed is:

1. A method for ascertaining a quantity of a crop harvested in a tailing auger of a combine, in which a tailings quantity is formed by at least grains and non-grain components, comprising the steps of displaying, by an evaluation and display unit, the quantity of the tailings by generating, by a grain stream measuring instrument which includes at least one pulse density sensor, grain stream signals (Y) which are proportional to a detected number of grains and crop stream signals (Z) which are proportional to a whole volumetric tailings stream only.

2. A method as defined in claim 1; and further comprising using a rod sensor as the pulse density sensor for measuring a proportion of grain in the tailings.

3. A method as defined in claim 2; and further comprising arranging a plurality of the rod sensors in an outlet region of the tailings leaving the cleaning system.

4. A method as defined in claim 2; and further comprising securing the rod sensor by a rubber spring element to a collector and guide pan of the tailing auger.

5. A method as defined in claim 1, wherein said generating includes generating the crop stream signals (Z) by a volumetric stream measuring instrument which measures a volumetric stream of a quantity of the tailings in an ear elevator of the tailings auger.

6. A method as defined in claim 1; and further comprising associating with a grain elevator a volumetric stream measuring instrument that generates the grain stream signals (X).

7. A method as defined in claim 6; and further comprising forwarding the grain stream signals (X, Y) and the crop stream signals (Z) to the evaluation and display unit; calculating by the evaluation and display unit a tailings grain quantity (k) from the grain stream signals (Y) of a tailings region, a tailings grain quantity (k1) from the grain stream signals (X) generated in a grain elevator, and a quantity of the tailings from the crop stream signals (Z).

8. A method as defined in claim 7; and further comprising calculating by the evaluation and display unit from the grain stream signals (Y), a thousand-grain mass of a fruit type, and an area equivalent comprising a sensor area and a useable filtration area of a tailings auger.

9. A method as defined in claim 7; and further comprising calculating a harvested grain volume by the evaluation and display unit from the grain stream signals (Y), a thousand-grain mass of a fruit type, an area equivalent comprising a sensor area and a usable filtration area of the tailing auger and a specific density.

10. A method as defined in claim 7; and further comprising displaying at least the tailings grain quantity (k) and the quantity of the tailings from the crop stream signals quantitatively simultaneously on separate displays on a screen of the evaluation and display unit.

11. A method as defined in claim 7; and further comprising displaying at least the tailings grain quantity (k) and the quantity of the tailings from the crop stream signals quantitatively on one display on a screen of the evaluation and display unit.

* * * * *